Patented Aug. 1, 1950

2,516,928

UNITED STATES PATENT OFFICE 2,516,928

COPOLYMERS OF UNSATURATED ETHERS

Daniel Swern, Philadelphia, Pa., assignor to the United States of America as represented by the Secretary of Agriculture No Drawing. Application January 16, 1948, Serial No. 2,797

13 Claims. (Cl. 260—78.3)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This invention relates to plastic compositions. It relates particularly to copolymers of olefinic compounds with unsaturated ethers derived from long chain fatty compounds, and has among its objects the provision of new compositions of matter and processes for their preparation.

It is known that a number of long chain compounds derived from fats and oils possess properties that render them useful as softeners and plasticizing agents. Utilization of such compounds in the production of plastics is often limited, however, by their low compatibility with many high molecular substances. Furthermore, many of these plasticizing agents when incorporated into the polymeric resinous material by mechanical means such as milling, or by forming a solution of the components, with subsequent elimination of the solvent, tend to exude from the resulting products, thereby imparting an undesirable "greasy feel" and a "foggy" appearance to the plasticized material. These inherent disadvantages of long chain modifiers and plasticizing agents can be obviated by the production of intramolecularly plasticized compositions, wherein the plasticizing or modifying agent is chemically bound in the polymer molecule by copolymerization with a reactive monomer. Heretofore, one difficulty in making the fatty compound an integral part of the polymer molecule by a copolymerization process has been the lack of suitable fat or oil derivatives containing the necessary functional groups.

I have found that compounds corresponding to the general formula

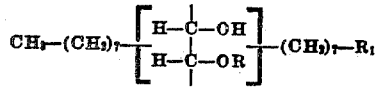

where R is the radical of an aliphatic monounsaturated olefinic alcohol preferably free of substituents other than halogen and R₁ is the primary alcohol group —CH₂OH or the ester group —COOR wherein R has the above stated significance, can be copolymerized with olefinic monomers, thereby modifying the characteristics of and imparting desirable properties to the resulting polymeric material.

In accordance with the method of my invention a mixture comprising an olefinic monomer and a compound corresponding to the aforementioned general formula is polymerized by any suitable means such as heat, light and/or a catalyst. Preferably, polymerization is effected by heating the monomer mixture at a temperature of about 40° to 100° C. in the presence of a polymerization catalyst or initiator such as an organic peroxide like benzoyl, lauroyl, stearoyl peroxide; a persulfate like ammonium persulfate; or other similar compounds commonly utilized as catalystic agents in the production of high molecular polymers. The polymerization process can be conducted either by bulk polymerization on the monomer mixture, or by emulsion polymerization, or in the presence of suitable inert solvents or diluents.

The method of the present invention is applicable in general, to copolymerization of olefinic monomers with compounds containing a primary alcohol group or an aliphatic, monounsaturated, olefinic, carboxyl ester group, linked to a 9,10-dihydroxyoctadecyl radical having one of the hydroxyl groups etherified by an aliphatic monounsaturated olefinic alcohol. Suitable compounds include, for example, the unsaturated ether-esters of 9,10-dihydroxystearic acids described in my copending application, Serial No. 2,796 filed January 16, 1948 and unsaturated ethers of 9,10-dihydroxyoctadecanol described in my copending application Serial No. 2,795, filed January 16, 1948, now U. S. Patent No. 2,491,533. One of several of the aforementioned ethers or ether-esters can be copolymerized with various active olefinic monomers, for example vinyl compounds like vinyl chloride, vinyl acetate or styrene; butadiene, isoprene, unsaturated phthalates like diallyl phthalate, acrylonitrile, isobutylene, polymerizable derivatives of maleic acid such as diallyl maleate and the like, used either singly or in combination.

The characteristics of the materials thus obtained can be varied by the choice of and the relative proportions of the individual components present in the monomer mixture and the conditions of polymerization. The unsaturated ether-esters of 9,10-dihydroxystearic acid and ethers of 9,10-dihydroxyoctadecanol suitable for use in my process may be prepared, for example, by reacting the unsaturated alcohol with 9,10-epoxystearic acid and 9,10-epoxyoctadecanol, respectively, as described in my copending applications Serial No. 2,795 and 2,796.

The following Examples I and II describe the preparation of unsaturated ether-esters of 9,10-dihydroxystearic acid. Preparation of unsaturated ethers of 9,10-dihydroxyoctadecanol is described in Examples III and IV.

Example I 29.9 g. 9,10-epoxystearic acid were dissolved in 120 ml. of allyl alcohol, with gentle heating. The solution was cooled below 30° C. and 0.3 g. of 95% sulfuric acid added with agitation. The mixture was heated on a steam bath for two hours and a quantity of sodium bicarbonate equivalent to the sulfuric acid was then added. The reaction mixture was fractionally distilled, first at atmospheric pressure to recover the unreacted allyl alcohol and then under vacuum to isolate the ether-ester. This was dissolved in acetone, using 2–3 ml. of solvent per gram of solute, and the solution cooled to about —20° C. to precipitate a small amount of by-products of the reaction. The precipitate was removed by filtration and discarded, and the solvent was evaporated from the filtrate. The residual oil consisted of almost pure allyl 9,10(10,9)-alloxyhydroxystearate which on redistillation yielded a product having the following characteristics.

Boiling range: 196°–202° C./0.35–0.5 mm.
Saponification equivalent: 387.5
$n_D^{30}$: 1.4589
$d_4^{30}$: 0.9266

Example II

Beta - chloroallyl-9,10(10,9)-beta-chloroalloxyhydroxystearate was prepared by reacting 9,10-epoxystearic acid with beta-chloroallyl alcohol by the procedure described in Example I and using 4 ml. of alcohol per gram of epoxystearic acid. After separation of the unreacted beta-chloroallyl alcohol by vacuum distillation, the residual reaction product was dissolved in ether and the ether solution was washed with water until free of sulfuric acid, treated with activated carbon for one hour, filtered and the ether evaporated. The residue was an amber colored liquid consisting essentially of beta-chloroallyl 9,10(10,9)-beta-chloroalloxyhydroxystearate.

Example III 9,10(10,9)-alloxyhydroxyoctadecanol, prepared and isolated by the procedure described in Example I, using 27.2 grams of 9,10-epoxyoctadecanol, 109 ml. of allyl alcohol and 0.3 gram of 95% sulfuric acid, had the following characteristics:

Boiling range: 171°–188° C./0.02–0.03 mm.
Molecular refraction: 102.9
$n_D^{30}$: 1.4627
$d_4^{30}$: 0.9166

Example IV 9,10(10,9) - beta - chloroalloxyhydroxyoctadecanol was prepared by reacting 9,10-epoxyoctadecanol with beta-chloroallyl alcohol by the procedure described in Example I and using 3 ml. of chloroallyl alcohol per gram of normal epoxyoctadecanol-1.

After neutralization of the catalyst with sodium bicarbonate, the unreacted beta-chloroallyl alcohol was distilled off under reduced pressure and the residue was dissolved in acetone (3 ml. per gram) and treated with activated carbon for one hour. The solution was filtered, cooled to about —20° C. and the small amount of precipitate which formed was filtered off and discarded. The acetone was distilled from the filtrate yielding as a residue 9,10(10,9)-beta-chloroalloxyhydroxyoctadecanol.

The following example illustrates the preparation of copolymers with active olefinic monomers.

Example V

Mixtures of allyl 9,10(10,9)-alloxyhydroxystearate and vinyl acetate, to which 0.5% by weight of benzoyl peroxide was added, were polymerized by heating first at about 48° to 50° C. for 72 hours, then at about 65° to 75° C. for 48 hours, and finally at about 85° C. for 24 hours. The composition of the monomer mixtures used and the physical properties of the resulting polymerization products are shown in the following table:

| Composition of Monomer Mixture (in parts by weight) | | Polymerizate | |
|---|---|---|---|
| Allyl 9,10(10,9)-Alloxyhydroxystearate | Vinyl Acetate | Solubility [1] | Physical Appearance |
| 0 | 100 | S | Hard, glasslike. |
| 1 | 99 | I | Do. |
| 9 | 91 | I | Do. |
| 20 | 80 | I | Tough, rubbery. |
| 30 | 70 | I | Soft, rubbery. |
| 40 | 60 | I | Do. |

[1] Solubility was determined in acetone at the boiling point and in acetic acid and amyl acetate at 100° C.
S=soluble; I=insoluble.

Similar products are obtained when other active olefinic monomers, such as vinyl chloride, diallyl phthalate, acrylonitrile, polymerizable derivatives of maleic acid, isobutylene, isoprene, styrene and butadiene singly or in combination, are used in place of the vinyl acetate in the foregoing example. In place of allyl-9,10(10,9)-alloxyhydroxystearate there can be used other unsaturated ether-esters of 9,10-dihydroxystearic acid; for example those described in application Serial No. 2,796.

Similar homogeneous products are also found by copolymerizing unsaturated ethers of 9,10 - dihydroxy - normal - octadecanol - 1, for example 9,10(10,9)-alloxyhydroxyoctadecanol, or 9,10(10,9)-beta - chloroalloxyhydroxyoctadecanol with vinyl acetate, or with other active olefinic monomers, such as those mentioned above, using the procedure described in the foregoing example.

Other organic peroxides and similar polymerization catalysts such as persulfates and the like can be used in place of benzoyl peroxide. Polymerization can be conducted by maintaining the monomer mixture at any temperature within the range of about 40° to 100° C. for a sufficient length of time; the rate of polymerization increasing with the temperature.

The designation "9,10(10,9)" signifies that the product consists of a mixture of the 9,10 and 10,9 compounds, formed as illustrated on page 1 of each application, Serial No. 2,795 and Serial No. 2,796. The nomenclature is in accordance with generally accepted usage; see J. Am. Chem. Soc. 70, 1226, 1235 et seq. (1948).

The expression, the radical of an aliphatic monounsaturated olefinic alcohol, is employed in its usual sense, the radical being the part remaining after subtracting the alcoholic OH group.

Having thus described my invention, I claim:

1. A process comprising conjointly polymerizing a monomeric polymerizable olefinic compound with a compound corresponding to the general formula

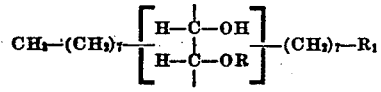

wherein R is the radical of an aliphatic mono-unsaturated olefinic alcohol and R₁ is a member of the group consisting of —CH₂OH and —COOR the R radicals being identical, by heating at about 40° to 100° C. in the presence of a polymerization catalyst taken from the group consisting of organic peroxides and inorganic persulfates.

2. The process comprising conjointly polymerizing vinyl acetate with a compound of the general formula

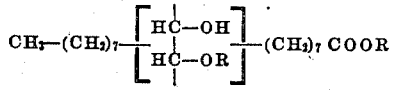

where R is the radical of an allyl alcohol taken from the group consisting of allyl alcohol and a chloroallyl alcohol, at about 40° to 100° C.

3. The process of claim 2 wherein R is the radical of a monochlorallyl alcohol.

4. The process of claim 2 wherein R is

5. The process of claim 2 wherein R is

6. The copolymer of a monomeric polymerizable olefinic compound with a compound corresponding to the general formula

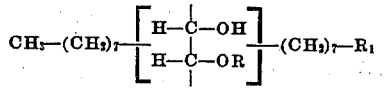

wherein R is the radical of an aliphatic monounsaturated olefinic alcohol and R₁ is a member of the group consisting of —CH₂OH and —COOR, the R radicals being identical.

7. The copolymer of vinyl acetate with an allyl ester-mono allyl ether of 9,10-dihydroxystearic acid.

8. The coplymer of vinyl acetate with a monoallyl ether of 9,10-dihydroxy-normal octadecanol-1, the allyl radical being in one of the 9 and 10 positions.

9. The process of claim 1 in which the weight ratio of the said monomeric polymerizable olefinic compound to the compound of the recited general formula is in the range from 99 to 1, to 60 to 40.

10. The process of claim 2 in which the weight ratio of the vinyl acetate to the compound of the recited general formula is in the range from 99 to 1, to 60 to 40.

11. The copolymer of vinyl acetate with allyl ester-mono allyl ether of 9,10-dihydroxystearic acid, the weight ratio of the vinyl acetate to the latter being in the range from 99 to 1, to 60 to 40.

12. A process comprising conjointly polymerizing a monomeric polymerizable vinyl ester with allyl ester-mono allyl ether of 9,10-dihydroxystearic acid by heating at 40° to 100° C. in the presence of a polymerization catalyst taken from the group consisting of organic peroxides and inorganic persulfates.

13. A process comprising conjointly polymerizing a monomeric polymerizable olefinic compound with allyl ester-mono allyl ether of 9,10-dihydroxystearic acid by heating at 40° to 100° C. in the presence of a polymerization catalyst taken from the group consisting of organic peroxides and inorganic persulfates.

DANIEL SWERN.

REFERENCES CITED

The following references are of record in the file of this patent:

UNITED STATES PATENTS

| Number | Name | Date |
|---|---|---|
| 2,437,508 | D'Alelio | Mar. 9, 1948 |
| 2,440,237 | Adelson et al. | Apr. 27, 1948 |
| 2,448,246 | Barker et al. | Aug. 31, 1948 |